United States Patent Office
2,756,222
Patented July 24, 1956

2,756,222

PURIFICATION OF LONG-CHAIN VINYL ESTERS AND ETHERS

Daniel Swern and William S. Port, Philadelphia, Pa., assignors to the United States of America as represented by the Secretary of Agriculture No Drawing. Application June 17, 1952,
Serial No. 294,110

9 Claims. (Cl. 260—96.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the purification of long-chain polymerizable monomers. It relates particularly to polymerizable monomers prepared from long-chain fatty acids or fatty alcohols, such as the vinyl esters and vinyl ethers.

In the preparation of soluble, thermoplastic polymers, the monomers used must be of a high degree of purity from the functionality standpoint, and they should be free, or substantially free, of inhibitors, retarders and cross-linking materials if any practical polymerization results are to be obtained. An object of this invention is to provide a convenient and inexpensive means for preparing polymerizable monomers derived from fatty acids or fatty alcohols substantially free of inhibitors.

Long-chain vinyl esters or ethers prepared from long-chain fatty acids or alcohols containing 6 to 22 carbon atoms in the fatty acid or alcohol chain are relatively new classes of organic monomers suitable for the preparation of soluble, thermoplastic polymers and copolymers. With few exceptions, fatty acids or alcohols suitable for the preparation of long-chain vinyl esters or ethers meeting the purity requirements outlined in the preceding paragraph are not commercially available. Therefore, the vinyl esters obtained by the reaction of these acids with acetylene or vinyl acetate or the vinyl ethers obtained by the reaction of these alcohols with acetylene require extensive purification to make them suitable for use as monomers. Furthermore, even when highly purified fatty acids or alcohols are employed in the preparation of vinyl esters or ethers, side-reaction products may form which must be removed before the vinyl ester or ether is suitable for use in the preparation of soluble, thermoplastic polymers and copolymers.

Procedures for the purification of long-chain vinyl esters have consisted of fractional distillation under vacuum, fractional crystallization from organic solvents, separation of certain impurities by formation of insoluble soaps, as disclosed in Patent No. 2,586,860, or combinations of these techniques. Fractional distillation procedures are not entirely satisfactory when the acid from which the vinyl esters is derived contains more than about 14 carbon atoms. Fractional crystallization procedures and separation of insoluble soaps are unsatisfactory when the chain length of the acid is less than about 16 carbon atoms. Long-chain vinyl ethers have also been purified by fractional distillation and crystallization but these procedures suffer from the same drawbacks as those given for the long-chain vinyl esters.

We have now discovered a purification technique which may be used either alone or in combination with one or more of the purification techniques described in the preceding paragraph. This technique does not require expensive equipment, elaborate procedures or expensive and rare chemicals, and is applicable to crude vinyl esters, such as those obtained in the reaction of fatty acids with acetylene or vinyl acetate, or crude vinyl ethers, such as those obtained in the reaction of fatty alcohols with acetylene. The organic solvents employed in this new technique are inexpensive and readily recoverable.

This new technique involves the formation of urea complexes from vinyl esters or ethers prepared from fatty acids or alcohols, respectively, containing from 6 to 22 carbon atoms in the fatty acid or alcohol chain. These complexes are crystalline, readily filterable solids which can be obtained in good yield not only from pure or nearly pure monomers, but also from monomer mixtures contaminated with polymers, inhibitors, colored materials, and the like. Monomers stored as complexes are remarkably stable to autoxidation and polymerization without any special precautions, such as addition of inhibitors. On treatment with water, the urea complexes are decomposed by solution of the urea, leaving the desired monomer as an immiscible oil or solid which can be readily separated in conventional manner, and used in a polymerization or other chemical reaction.

In the preferred application of this invention, three to seven parts of urea are dissolved in a solution of one part of monomer in five to twenty parts of methanol, isopropanol or their mixtures, and the solution is allowed to stand between 0° and 50° C. until complex formation is substantially complete. The mixture is then filtered yielding the monomer in the precipitate as urea complex, the filtrate containing the impurities. Isolation of the monomer from the complex is simply achieved by adding water to dissolve the urea.

It is not necessary that homogeneous solutions be employed in the application of this new technique. The monomer, containing the impurities to be separated, can be mixed with aqueous solutions of urea to form the urea complex of the monomer, which can then be separated from the undesirable components. This latter technique is not as convenient as the organic solvent technique because of the oleophilic nature of the urea complex rendering its separation from the impurities tedious and difficult. Mixtures of powdered urea and the monomer-containing mixture, to which a small amount of mutual solvent, such as methanol, is added can also be used. Also, a dispersion of powdered urea in a non-solvent, such as benzene, can be treated with the monomer-containing material, causing complex to form and precipitate leaving the impurities in solution. A small amount of methanol (about 5%) is preferably employed with the benzene. We do not wish to be limited, however, to the use of organic solvents only, although this technique is more convenient to use in the laboratory.

The following examples are illustrative of the invention:

EXAMPLE 1

(A) *Preparation of urea complex from vinyl palmitate*

Five grams of vinyl palmitate (iodine number, 87.9, $n_D^{30}$ 1.4436) was dissolved in a solution of 100 ml. of methanol containing 15 g. of urea. The mixture was cooled to 0° C. and filtered, yielding 14.9 g. (75% yield) of urea-vinyl palmitate complex as a crystalline precipitate.

(B) *Isolation of vinyl palmitate from urea-vinyl palmitate complex*

Two grams of the urea-vinyl palmitate complex of A, above, was stirred with 100 ml. of water. The urea immediately dissolved, leaving the vinyl palmitate as an insoluble residue. The weight of vinyl palmitate obtained was 0.3 g. (60% yield), iodine number, 82.3, and $n_D^{30}$ 1.4432.

EXAMPLE 2

*Isolation of vinyl palmitate from crude monomer mixture*

Twenty-six grams of crude vinyl palmitate containing monomer, polymer, inhibitors and unknown components, was added to 500 ml. of methanol. The solution was filtered to remove insoluble polymer. Seventy-five grams of urea was dissolved in the filtrate, which was allowed to stand at room temperature until complex formation was complete. The yield of complex was 44 grams and it contained 38.5% of the vinyl palmitate present in the original mixture. By the use of larger quantities of urea yields of vinyl palmitate-urea complex as high as 83% have been obtained from crude vinyl palmitate mixtures. The vinyl palmitate, isolated from the complex by the technique described in Example 1 (B), forms soluble thermoplastic polymers when heated with benzoyl peroxide as catalyst.

EXAMPLE 3

*Preparation of urea complex from vinyl pelargonate*

By a procedure similar to that described in Example 1, the urea complex of vinyl pelargonate, iodine number 136.2, was prepared in 56% yield.

Vinyl pelargonate prepared from redistilled commercial pelargonic acid, contains small quantities of cross-linking contaminants, probably divinyl esters of dibasic acids. These impurities have boiling points so close to that of vinyl pelargonate that a separation by distillation cannot be effected. When such samples of vinyl pelargonate are caused to polymerize by heating with benzoyl peroxide, gels form, rather than soluble, thermoplastic polymers.

EXAMPLE 4

*Preparation of vinyl pelargonate free of cross-linking impurities*

Two hundred grams of vinyl pelargonate, $n_D^{30}$ 1.4280, containing cross-linking contaminants, was dissolved in a solution consisting of 800 g. of urea and 4000 ml. of methanol. The solution was allowed to stand at 27° C. until complex formation was complete and the mixture was filtered, yielding 320 grams of urea-vinyl pelargonate complex as a precipitate. Addition of water to the precipitate dissolved the urea and yielded 80 grams (40% yield) of vinyl pelargonate, $n_D^{30}$ 1.4284, as an immiscible oil.

The methanol filtrate from the above separation was cooled to 2° C. and an additional crop of urea-vinyl pelargonate complex weighing 316 grams was obtained. The vinyl pelargonate, $n_D^{30}$ 1.4280, isolated from it by the addition of water weighed 78.2 grams (39% yield).

The second methanol filtrate was concentrated to about one-fourth its volume and cooled to room temperature. The yield of urea-vinyl pelargonate complex was 187.3 g. from which 40.6 grams (20% yield) of vinyl pelargonate, $n_D^{30}$ 1.4270, was isolated.

The total yield of vinyl pelargonate was 99%. A portion of each of the three fractions of vinyl pelargonate was polymerized, yielding benzene-soluble polymers. Thus, the cross-linking contaminants, present in small quantities in the original, had been separated and confined to the final methanol filtrate.

EXAMPLE 5

(A) *Preparation of complex from vinyl laurate*

By a procedure similar to that described in Example 1, except that 25 g. of urea was employed, the urea complex of vinyl laurate was prepared in 71% yield.

(B) *Isolation of vinyl laurate from urea-vinyl laurate complex*

The complex was decomposed substantially as described in Example 1 (B), except that the vinyl laurate liberated as an insoluble oil was extracted with benzene. Recovery of vinyl laurate was quantitative.

EXAMPLE 6

(A) *Preparation of urea complex from vinyl stearate*

By the procedure described in Example 5 (A), but operating at room temperature, the urea complex of vinyl stearate was prepared in 86% yield.

(B) *Isolation of vinyl stearate from urea-vinyl stearate complex*

The complex was decomposed substantially as described in Example 1 (B), except that the liberated vinyl stearate was extracted with benzene. Recovery of vinyl stearate was quantitative.

EXAMPLE 7

*Preparation of urea complex from vinyl octadecyl ether*

Five grams of vinyl octadecyl ether was dissolved in a solution of 120 ml. of isopropanol and 80 ml. of methanol containing 20 g. of urea. The solution was cooled to 0° C. and filtered, yielding 20.2 g. (100% yield) of urea-vinyl octadecyl ether complex as a crystalline precipitate.

We claim:

1. A process for purifying an impure polymerizable monomer containing as an impurity at least one member selected from the group consisting of a polymerization inhibitor, a cross-linking agent, and a polymer of the said monomer, and being selected from the group consisting of a vinyl ester of a straight-chain fatty acid having from 6 to 22 carbon atoms in the fatty acid chain and a vinyl ether of a straight-chain fatty alcohol having from 6 to 22 carbon atoms in the fatty alcohol chain, comprising reacting the impure monomer with urea at a temperature of about from 0° to 50° C. to form a complex of the urea with the pure monomer, separating the urea complex from the resulting reaction mixture, and isolating the urea from the complex to obtain the pure monomer.

2. The process of claim 1 wherein the monomer is vinyl palmitate.

3. The process of claim 1 wherein the monomer is vinyl pelargonate.

4. The process of claim 1 wherein the monomer is vinyl laurate.

5. The process of claim 1 wherein the monomer is vinyl stearate.

6. The process of claim 1 wherein the monomer is vinyl octadecyl ether.

7. A process for purifying an impure polymerizable monomer containing as an impurity at least one member selected from the group consisting of a polymerization inhibitor, a cross-linking agent, and a polymer of the said monomer, and being selected from the group consisting of a vinyl ester of a straight-chain fatty acid having from 6 to 22 carbon atoms in the fatty acid chain and a vinyl ether of a straight-chain fatty alcohol having from 6 to 22 carbon atoms in the fatty alcohol chain, comprising dissolving urea in a solution of the monomer in a solvent selected from the group consisting of methanol, isopropanol, and mixtures thereof, allowing the resulting solution to stand at temperature between 0° and 50° C. until the resulting formation of urea complex with the monomer is substantially complete, filtering the resulting mixture to obtain the urea complex as a precipitate, and isolating the monomer from the complex by adding water thereto to dissolve the urea.

8. A process which comprises the steps of (a) forming a crystalline urea complex of a polymerizable vinyl monomer selected from the group consisting of a vinyl ester of a straight-chain fatty acid having from 6 to 22 carbon atoms in the fatty acid chain and a vinyl ether of a straight-chain fatty alcohol having from 6 to 22 carbon atoms in the fatty alcohol chain, (b) storing the complex at ordinary temperatures and in the presence of air, and (c) recovering the pure monomer from the complex by washing with water to remove the urea.

9. A composition of matter that may be stored at ordinary temperatures and in the presence of air without undergoing polymerization, autoxidation or other deterioration, comprising the crystalline urea complex of a polymerizable monomer selected from the group consisting of a vinyl ester of a straight-chain fatty acid having from 6 to 22 carbon atoms in the fatty acid chain and a vinyl ether of a straight-chain fatty alcohol having from 6 to 22 carbon atoms in the fatty alcohol chain.

References Cited in the file of this patent

UNITED STATES PATENTS

| | | |
|---|---|---|
| 2,549,372 | Fetterly | Apr. 17, 1951 |
| 2,594,481 | Bowman et al. | Apr. 29, 1952 |
| 2,596,344 | Newey et al. | May 13, 1952 |
| 2,642,423 | Gorin | June 16, 1953 |
| 2,676,955 | Weitkamp et al. | Apr. 27, 1954 |
| 2,700,036 | Bradley et al. | Jan. 18, 1955 |

OTHER REFERENCES

Bengen (German patent application, O. Z. 12,438), Reel 143, T. O. M., pages 135 to 138, dep. in the Library of Congress, May 22, 1946.

Smith: "The Journal of Chemical Physics," vol. 18, No. 1, pp. 150–1.